W. T. CHILDS.
AUTOMOBILE COUPLING ATTACHMENT.
APPLICATION FILED SEPT. 24, 1910.

994,374.

Patented June 6, 1911.

WITNESSES

INVENTOR
W. T. Childs
BY
ATTORNEY

UNITED STATES PATENT OFFICE.

WILLARD T. CHILDS, OF SPRINGFIELD, MASSACHUSETTS.

AUTOMOBILE COUPLING ATTACHMENT.

994,374. Specification of Letters Patent. Patented June 6, 1911.

Application filed September 24, 1910. Serial No. 583,665.

*To all whom it may concern:*

Be it known that I, WILLARD T. CHILDS, a citizen of the United States, residing at Springfield, in the county of Hampden and State of Massachusetts, have invented certain new and useful Improvements in Automobile Coupler Attachments, of which the following is a specification.

The object of the present invention is the provision of a simple and inexpensive coupling attachment by means of which two vehicles such as a pair of automobiles can be easily and quickly coupled together for the purpose of enabling one of the vehicles to be trailed behind the other vehicle.

The invention is more particularly designed for use in connection with automobiles, and will enable a disabled automobile to be coupled to another automobile and drawn to a garage or repair shop without the trouble and annoyance which is usually incident to such a procedure.

The invention aims to provide a coupling attachment of this character which can be quickly applied to an automobile or removed therefrom, which can be stored in a very small amount of space when not in use, and which will securely engage the axles of the automobile without danger of marring or otherwise injuring the same.

With these and other objects in view, the invention consists in certain novel arrangements and combinations of the parts as will more fully appear as the description proceeds, the novel features being pointed out in the appended claims.

For a full understanding of the invention, reference is to be had to the accompanying drawings, in which:—

Figure 1:
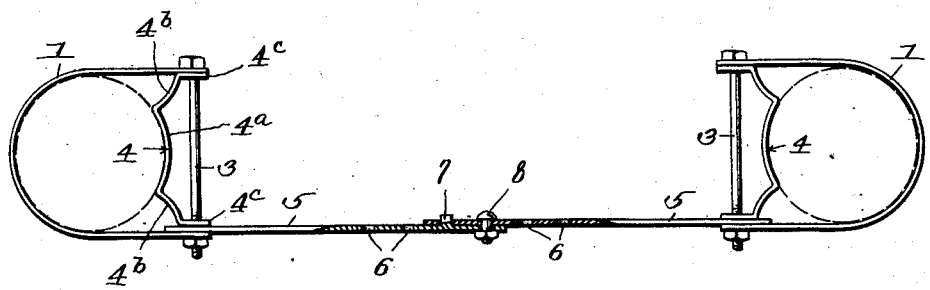
Figure 2:
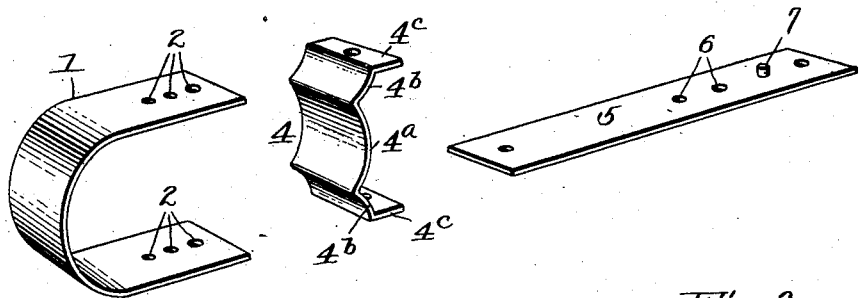
Figure 3:
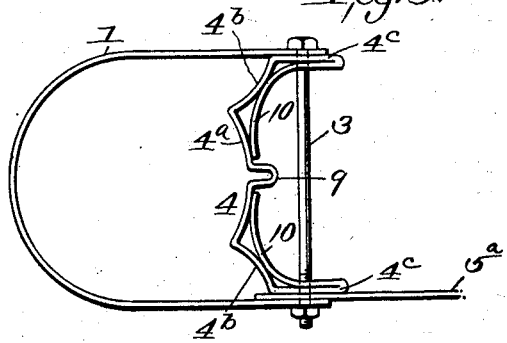

Figure 1 is a side elevation of an automobile coupling attachment constructed in accordance with the invention, portions being shown in section; Fig. 2 is a detached perspective view of one of the axle engaging clamps and one of the coupling links; Fig. 3 is a side elevation of a modified form of axle engaging clamp.

Corresponding and like parts are referred to in the following description and indicated in all the views of the drawings by the same reference characters.

Specifically describing the present embodiment of the invention, the numerals 1 designate a pair of clips which are substantially U-shaped in construction and are designed to be fitted around the axles of the vehicles to be coupled together. The limbs of these axle clips 1 are formed with a series of corresponding openings 2, any selected pair of which is adapted to receive a bolt or pin 3. This bolt 3 prevents the limbs of the axle clip from spreading and also engages a resilient axle clamping member 4. These clamping members 4 coöperate with the clips 1 to engage the vehicle axles and the said clamping members have a spring construction which enables them to securely grip the axles without danger of injuring or marring the same. In the preferred construction, each of the clamping members 4 is formed of a single strip of spring material, the middle portion of the strip being curved in the form of an arc as indicated at $4^a$ so as to fit against one side of the axle, the end portions of the strip being then diverged rearwardly at $4^b$ and the extremities of the strip extending rearwardly in a parallel relation to form the ears $4^c$ which are engaged by the bolt 3. The rearwardly diverging portions $4^b$ at each end of the arc shaped axle engaging portion $4^a$ are preferably given a slight curvature so as to increase the resiliency thereof and admit of the arc shaped portion $4^a$ being always retained in a firm engagement with the axle. The bolts 3 also pass through openings in the ends of coupling links 5, the meeting ends of the said coupling links overlapping each other and being each provided with a series of openings 6. One of the coupling links is provided with a lug 7 which is designed to engage one of the openings 6 in the opposite coupling link, and a fastening member, such as the bolt 8, is then inserted through an alining pair of the said openings 6 in the two links. In this manner the two coupling links 5 are adjustably connected so that the effective length thereof can be increased or decreased as desired, and the said links are always held rigidly in alinement with each other so that the rear vehicle will be prevented from bumping against the front vehicle when the latter is brought to a stop or the speed thereof is slackened.

In applying the invention, the axle clips 1 are fitted around the axles of the vehicles to be coupled, the clamping members 4 inserted between the limbs of the axle clips and brought into a yielding engagement with the axles, and the bolts 3 passed through the portions $4^c$ of the clamping members and the proper openings 2 in the axle clips. As has been previously mentioned, the resilient construction of the axle clamping members 4 compensates for the steps between the various openings 2 and admits of a firm engagement being always obtained with the axle. After the clamping members have been applied to the axles, the vehicles can be brought together and the ends of the coupling links 5 properly connected through the medium of the lug 7 and bolt 8. The rear vehicle can then be drawn behind the front vehicle and is always held in a properly spaced relation thereto so that neither of the vehicles will be marred or injured in any manner.

A slightly modified form of the axle clamp is shown in Fig. 3, in which the middle portion of the arc shaped jaw 4$^a$ of the clamping member 4 is formed with a crimp 9 and the extremities of the ears 4$^c$ are returned upon themselves to provide the curved fingers 10 which bear loosely against the diverging arms 4$^b$ and the jaw 4$^a$ so as to increase the resiliency of the member. The crimp 9 admits of the end portions of the arc shaped jaw 4$^a$ assuming various angles with relation to each other to accommodate different sizes of axles, while the spring fingers 10 serve to reinforce the diverging arms 4$^b$ and also tend to prevent the crimped middle portion of the jaw 4$^a$ from being forced outwardly away from the axle. This modified form of the invention would be applied to the axle of a vehicle in a manner identical with that previously described in connection with the preferred form of the invention, and the two axle clamps would be connected by the coupling links 5$^a$.

Having thus described the invention, what is claimed as new and desired to be secured by Letters Patent, is:—

1. An automobile coupler comprising a pair of U-shaped axle clips, pins connecting the limbs of the clips, axle clamping members engaged by the said pins and bearing against the axles, and a coupling link between the two axle clips.

2. An automobile coupler comprising a pair of U-shaped axle clips, pins connecting the limbs of the clips, axle clamping members engaged by the pins and adapted to bear against the axles, a pair of coupling links connected at their outer ends to the said pins, the inner ends of the coupling links overlapping each other and being provided with corresponding openings, a stud projecting from one of the links and adapted to enter an opening of the opposite link, and a fastening member adapted to engage a pair of alining openings in the links.

3. An automobile coupler comprising a pair of U-shaped axle clips, pins connecting the limbs of the clips, a resilient axle engaging member applied to each of the clips, the said axle engaging members being each formed of a spring strip of material the middle portion of which is designed to engage the axle while the end portions are diverged rearwardly and the extremities of the strip caused to engage the pin, and connecting means between the pins of the two clips.

4. An automobile coupler comprising a pair of U-shaped axle clips, pins connecting the limbs of the clips, an axle engaging member applied to each of the clips, each of the axle engaging members being formed of a strip of spring material the middle portion of which is curved in the form of an arc to engage an axle, while the end portions of the strip are diverged rearwardly to form spring arms, the extremities of the strip being extended rearwardly in parallel relation and engaging the pin, and connecting means between the pins of the two clips.

5. An automobile coupler including a U-shaped axle clip, a pin connecting the limbs of the clip, an axle engaging member applied to the clip and formed of a strip of spring material, the middle portion of the strip forming the jaw for engaging the axle while the end portions of the strip are diverged rearwardly and serve to engage the pin, the extremities of the strip being returned upon themselves and bearing yieldingly against both the diverged end portions thereof and the jaw.

6. An automobile coupler including a U-shaped axle clip, a pin connecting the arms of the clip, an axle engaging member applied to the clip and formed of a strip of spring material, the middle portion of the said strip forming a jaw for engaging the axle, while the end portions thereof are extended rearwardly and engage the pin, the central portion of the jaw being crimped to admit of the jaw accommodating itself to various sizes of axles, and a coupling link connected to the pin.

In testimony whereof I affix my signature in presence of two witnesses.

WILLARD T. CHILDS.

Witnesses:
HARLAN P. SMALL,
BERTHA L. BASSETT.